(12) United States Patent
Vinnakota et al.

(10) Patent No.: US 10,409,876 B2
(45) Date of Patent: Sep. 10, 2019

(54) INTELLIGENT CAPTURE, STORAGE, AND RETRIEVAL OF INFORMATION FOR TASK COMPLETION

(71) Applicant: Microsoft Technology Licensing, LLC., Redmond, WA (US)

(72) Inventors: Rajasekhar Vinnakota, Hyderabad (IN); Deepinder Singh Gill, Hyderabad (IN); Ravi Gupta, Hyderabad (IN); Vipindeep Vangala, Hyderabad (IN); Srinivasa Varadhan Thirumalai-Anandanpillai, Hyderabad (IN)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 364 days.

(21) Appl. No.: 15/166,182

(22) Filed: May 26, 2016

(65) Prior Publication Data
US 2017/0344649 A1 Nov. 30, 2017

(51) Int. Cl.
*G06F 16/9535* (2019.01)
*G06F 16/2458* (2019.01)
*G06F 16/901* (2019.01)

(52) U.S. Cl.
CPC ...... *G06F 16/9535* (2019.01); *G06F 16/2465* (2019.01); *G06F 16/9024* (2019.01)

(58) Field of Classification Search
CPC ......... G06F 17/30539; G06F 17/30401; G06F 17/30528; G06F 17/278
See application file for complete search history.

(56) References Cited

U.S. PATENT DOCUMENTS

| | | |
|---|---|---|
| 6,819,256 B2 | 11/2004 | Hampton |
| 8,375,320 B2 | 2/2013 | Kotler et al. |
| 8,385,944 B1 | 2/2013 | Nelissen |
| 8,583,090 B2 | 11/2013 | Vartiainen et al. |
| 8,718,614 B2 | 5/2014 | Kolodziej |

(Continued)

OTHER PUBLICATIONS

Dube, 8 Amazing, Life-Improving Uses for Google Now Reminders, Feb. 23, 2016 https://www.makeuseof.com/tag/8-amazing-life-improving-uses-google-now-reminders/ (Year: 2016).*

(Continued)

*Primary Examiner* — William Spieler
(74) *Attorney, Agent, or Firm* — Merchant & Gould

(57) ABSTRACT

Intelligent capture, storage, and retrieval of information for task completion are provided. A user can explicitly request to capture information, or user information is implicitly captured from one or more data streams. Semantic understanding of captured information is provided, wherein offline processes are run that analyze captured information to bucket them into a set of pre-defined high value scenarios. Whenever a capture falls into such scenarios, additional structured information about the capture is extracted. Further, aspects provide for storing and indexing information in a data repository. Users are enabled to explicitly retrieve the stored information using a natural language interface, or stored information can be proactively provided to the user based on context to enable task completion.

20 Claims, 9 Drawing Sheets

(56) References Cited

U.S. PATENT DOCUMENTS

| | | | | |
|---|---|---|---|---|
| 8,766,793 | B2* | 7/2014 | Elumalai | G06Q 10/109 340/539.1 |
| 8,832,205 | B2 | 9/2014 | Nelson et al. | |
| 9,195,734 | B2 | 11/2015 | Sar et al. | |
| 2006/0288347 | A1* | 12/2006 | Jemiolo | G06Q 10/109 718/102 |
| 2011/0239158 | A1 | 9/2011 | Barraclough et al. | |
| 2012/0108268 | A1 | 5/2012 | Lau et al. | |
| 2012/0117036 | A1* | 5/2012 | Lester | G06Q 10/109 707/692 |
| 2012/0158703 | A1 | 6/2012 | Li et al. | |
| 2013/0268507 | A1 | 10/2013 | Macbeth et al. | |
| 2014/0143196 | A1 | 5/2014 | White et al. | |
| 2014/0172986 | A1* | 6/2014 | Kumar | G06Q 10/107 709/206 |
| 2014/0358887 | A1* | 12/2014 | Morris | G06F 17/3053 707/709 |
| 2015/0081718 | A1 | 3/2015 | Schmidt | |
| 2015/0127632 | A1 | 5/2015 | Khaitan et al. | |
| 2015/0200892 | A1 | 7/2015 | Ramachandran | |
| 2015/0278370 | A1 | 10/2015 | Stratvert et al. | |
| 2015/0293904 | A1 | 10/2015 | Roberts | |
| 2016/0055246 | A1* | 2/2016 | Marcin | G06F 17/278 707/732 |
| 2016/0364382 | A1* | 12/2016 | Sarikaya | G06F 17/28 |

OTHER PUBLICATIONS

Paul, Awesome new Google Now feature helps you keep track of your bills, Oct. 8, 2014 https://www.greenbot.com/article/2692529/awesome-new-google-now-feature-helps-you-keep-track-of-your-bills.html (Year: 2014).*

Newman, Google Now Gets Even Creepier (and Why That's a Good Thing), Dec. 7, 2012 http://techland.time.com/2012/12/07/google-now-gets-even-creepier-and-thats-a-good-thing/ (Year: 2012).*

Berls, http://www.brucebnews.com/2013/01/google-now-androids-ambitious-app-pulls-you-into-the-google-ecosystem/, Jan. 3, 2013 http://www.brucebnews.com/2013/01/google-now-androids-ambitious-app-pulls-you-into-the-google-ecosystem/ (Year: 2013).*

Wallen, Okay Google Now remind me of how awesome you are, Mar. 4, 2014 https://www.techrepublic.com/article/okay-google-now-remind-me-of-how-awesome-you-are/ (Year: 2014).*

Starr, Search, Answers & Knowledge Graphs Galore, https://searchengineland.com/search-answers-knowledge-graphs-galore-163217 (Year: 2013).*

"International Search Report and Written Opinion Issued in PCT Application No. PCT/US2017/033205", dated Jul. 4, 2017, 9 Pages.

Carey, Conner, "Set Up Contextual Reminders with Siri in iOS 9", Published on: Oct. 21, 2015, Available at: https://www.iphonelife.com/content/set-contextual-reminders-siri-ios-9.

Ha, Anthony, "Google Now: Contextual Results With Real-Time Reminders And Data", Published on: Jun. 27, 2012, Available at: http://techcrunch.com/2012/06/27/google-now/.

* cited by examiner

INTELLIGENT CAPTURE, STORAGE, AND RETRIEVAL OF INFORMATION FOR TASK COMPLETION

BACKGROUND

Computing device users are exposed to vast amounts of information including information users may need help with remembering and with being able to access when wanted or needed. A traditional example method of storing information is a "save" paradigm, for example, where a user stores information in a document, such as a word processing document, slide presentation document, spreadsheet, notes document, mail messages, or the like. Such an approach can be effective for desktop computer users, for example, who store large amounts of information. However, a user would need to remember where the information is stored to access and use the saved information.

Additionally, many computer users are moving away from a personal computer paradigm to a mobile-only or mobile-first paradigm, and the consumption pattern associated with how users consume information is changing. For example, users are increasingly storing snippets of information primarily associated with an entity, such as a name of a restaurant, a contact name and/or number, a date, a fact, directions, a membership number, account information, etc., and may utilize various approaches to storing and accessing information. For example, a user may enter and store information using a contacts or notes application, or use an embedded camera for capturing an image of information. Such approaches may require the user to explicitly capture the information, and then find and retrieve the information when needed. As another example, a user may explicitly command a personal assistant application to provide a reminder for a specific item based a date, time of day, a place the user is going to or leaving, or a person with whom the user is in contact. While this example approach enables contextual surfacing of information, it also requires an explicit action of the user to capture the information. In addition to the above, as technology advances, expectations of users change. For example, users increasingly expect intelligence applied to stored information, and for systems to provide rich information with additional metadata.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Aspects are directed to a device, method, and computer-readable medium for enabling intelligent capture, storage, and retrieval of information for task completion. An intelligent capture storage and response (ICSR) system is provided for receiving explicitly captured information or for implicitly capturing information associated with a user, semantically understanding the information, generating inferences based on the information, and reactively or proactively retrieving and providing meaningful information to the user based on context.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1:
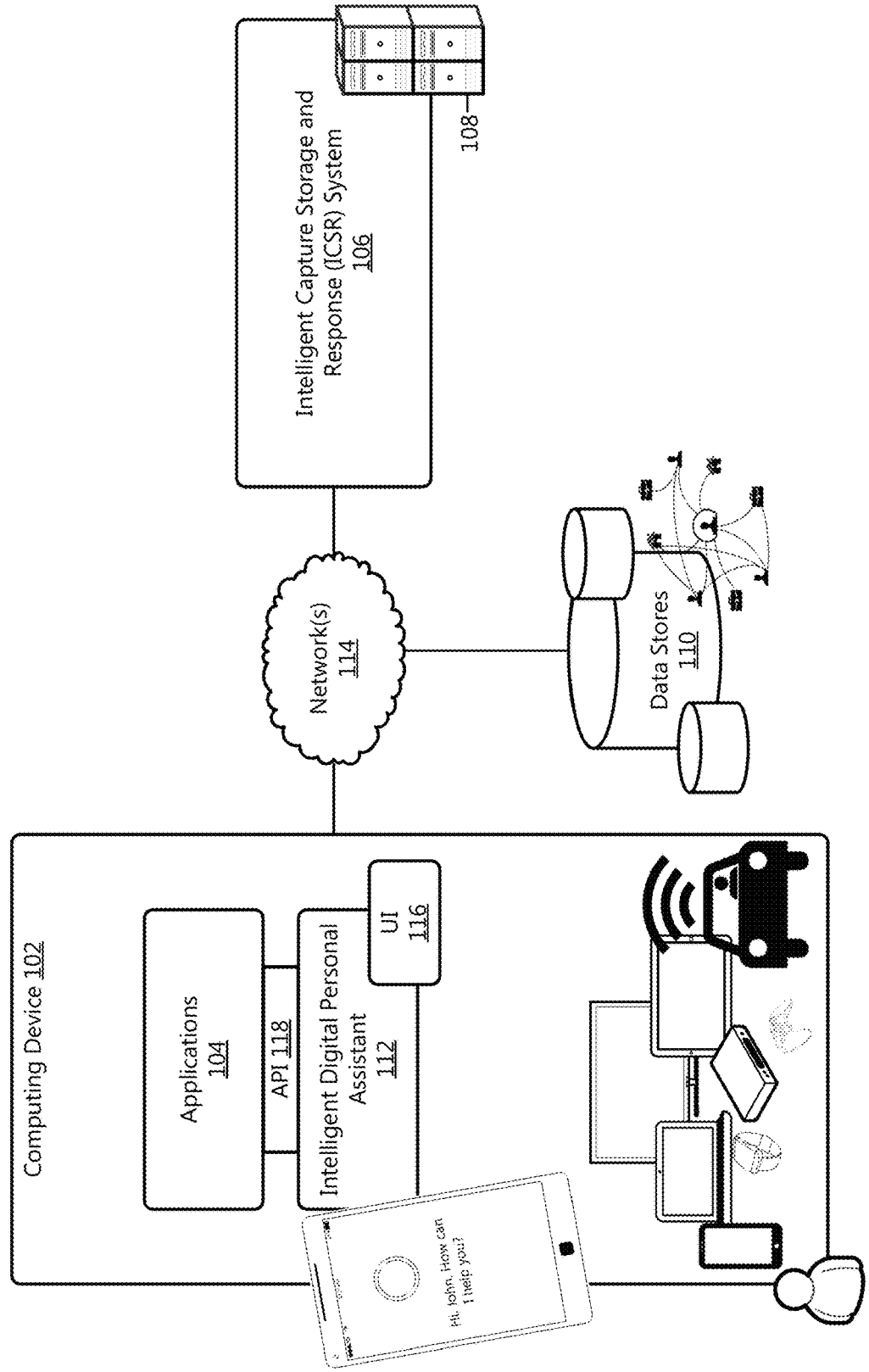
FIG. 1 is a simplified block diagram illustrating an example environment in which intelligent capture, storage, and retrieval of information for task completion may be implemented.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a device, method, and computer-readable medium for providing intelligent capture, storage, and retrieval of information for task completion. For example, aspects enable a means to capture information explicitly, such as by free form text, tagged photo, or an explicit command to remember. Additionally, aspects enable a means to implicitly capture user information, such as by understanding different data streams stored images, visited webpages, etc. In addition, semantic understanding of captured information is provided. For example, offline processes are run that analyze captured information to bucket them into a set of pre-defined high value scenarios. Whenever a capture falls into such scenarios, more structured information about the capture is extracted. Further, aspects provide for storing and indexing information in a data repository. Users are enabled to explicitly retrieve the stored information using a natural language interface, or stored information can be proactively provided to the user to enable task completion. According to an aspect captured information is stored on a backend server, and heavy data analysis and processing for intelligent capture, storage, and retrieval of information are performed by a backend server device, thus conserving memory and reducing the processor load of the user's computing device.

FIG. 1 illustrates a simplified block diagram of a representation of a computing environment 100 in which intelligent capture, storage, and retrieval of information for task completion may be implemented. As illustrated, the example environment includes a computing device 102 executing an intelligent digital personal assistant 112 enabled to remotely access an intelligent capture storage and response (ICSR) system 106 through a network 114 or a combination of networks, which include, for example and without limitation, a wide area network (e.g., the Internet), a local area network, a private network, a public network, a packet network, a circuit-switched network, a wired network, and/or a wireless network. The computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, or other type of computing device) for executing applications 104 for performing a variety of tasks. The hardware of these computing devices is discussed in greater detail in regard to FIGS. 6, 7A, 7B and 8.

In one example, applications 104 include a productivity application, which a user may utilize on the computing device 102 for a variety of tasks, which may include, for example, to write, calculate, draw, take and organize notes, organize, prepare presentations, send and receive electronic mail, browse web content, make music, and the like. Applications 104 may include thick client applications, which may be stored locally on the computing device 102, or may include thin client applications (i.e., web applications) that reside on a remote server and accessible over a network 114 or combination of networks. A thin client application may be hosted in a browser-controlled environment or coded in a browser-supported language and reliant on a common web browser to render the application executable on the computing device 102.

In one example, the intelligent digital personal assistant 112 is instantiated in an operating system (OS) layer of the computing device 102. In another example, functionality provided by the intelligent digital personal assistant 112 is implemented, in whole or part, using components that are supported in application or hardware layers of the computing device 102. According to an aspect, the intelligent digital personal assistant 112 is operative to perform functions or services for the user, such as set reminders, recognize natural user input, answer questions using external data via a search engine, search for files on the computing device 102 or in data storage repositories 110 in communication with the computing device 102, perform calculations and conversions, track flights and packages, check the weather, set alarms, launch applications 104, send messages, create calendar events, and the like. Such functions or services may be performed, for example, based on user input (e.g., an explicit request made by the user), or proactively based on contextual information, such as time/date, the user's location, language, schedule, applications 104 installed on the computing device 102, the user's preferences, the user's behaviors (in which such behaviors are monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., schedules, preferences, etc.), and the like. Some examples of conventional digital personal assistants include CORTANA® (published by Microsoft Corporation of Redmond, Wash.), SIRI® (published by Apple Computer of Cupertino, Calif.), and GOOGLE NOW™ (published by Google, Inc. of Mountain View, Calif.).

According to an aspect, the intelligent digital personal assistant 112 or applications 104 employ a user interface (UI) 116 by which a user can submit questions, commands, or other verbal input and by which responses to such input or other information may be delivered to the user. In one example, the input may comprise user speech that is captured by a microphone of the computing device 102. This example is not intended to be limiting, and user input may be provided in other ways. For example, various user interface technologies may be employed where user input may be received via hardware input devices, such as mice, keyboards, remote controls, pens/styluses, and the like. As another example, user input may be received via natural input devices/methods that enable a user to interact with the computing device 102 in a "natural" manner, such as those relying on speech recognition, touch and stylus recognition, gesture recognition both on screen and adjacent to the screen, air gestures, head and eye tracking, voice and speech, vision, touch, hover, gestures, and machine intelligence. Responses may be made visible to the user in the form of text, images, or other visual content shown on a display within a graphical user interface (GUI) of the intelligent digital personal assistant 112 or application 104. The responses may also comprise computer-generated speech or other audio content that is played back via speaker(s) of the computing device 102 or connected to the computing device.

As illustrated in FIG. 1, the computing device 102 is communicatively connected to the ICSR system 106 via one or more networks 114. According to an aspect, the ICSR system 106 comprises one or a plurality of computers (e.g., server computers 108) that are programmed to provide services in support of the operations of intelligently capturing, storing, and retrieving information for task completion. In one example, the ICSR system 106 is integrated with or communicatively attached with an intelligent digital personal assistant backend system that is operative to provide services in support of the operations of the intelligent digital personal assistant 112 and other intelligent digital personal assistants executing on other computing devices. In one example, the computing device 102 includes an application programming interface (API) 118 operative to enable the intelligent digital personal assistant 112 to communicate with various applications 104, for example, to access ICSR system 106 functionalities via stored instructions. In another example, the ICSR system 106 is enabled to communicate directly with the various applications 104 for providing intelligent capture, storage, and retrieval of information for task completion.

Figure 2:
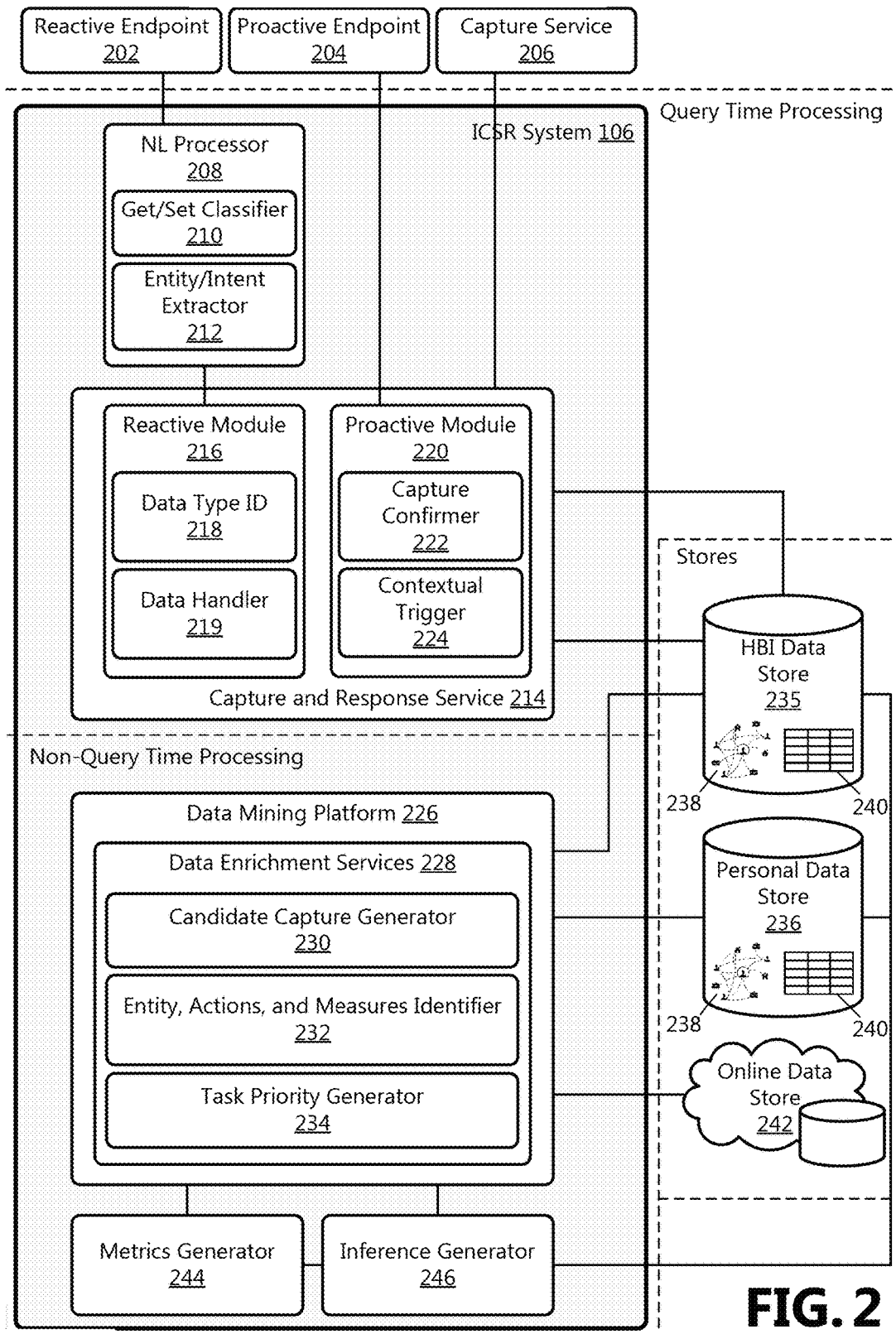
FIG. 2 is a simplified block diagram illustration various components of an example ICSR system.

With reference now to FIG. 2, a simplified block diagram including various components of the ICSR system 106 is illustrated. As should be appreciated, all or combinations of the various components may be implemented across a plurality of server computers 108. According to an aspect, when a user utilizes the intelligent digital personal assistant 112 or an application 104 to explicitly request to capture information (e.g., "remember my sister's birthday is June 24$^{th}$") or explicitly request to retrieve captured information, for example, in the form of a question, command, or a request to perform a function related to captured information (e.g., "when is my sister's birthday?" or "text Joe my sister's birthday"), the intelligent digital personal assistant 112 or application 104 is operative to utilize a reactive endpoint 202 to send the request to the ICSR system 106. In one example, the reactive endpoint 202 is manifested on the user's computing device 102. In another example, the reactive endpoint 202 is manifested in a service connected to the user (e.g., an application service, a service with which the user has an account).

According to an example, when a user submits a question, command, or other input via a UI 116 employed by intelligent digital personal assistant 112 or application 104, the input is sent to a natural language (NL) processor 208. In one example, the input is a text string entered by the user or spoken by the user and converted to text, for example, via a speech recognition service or a speech-to-text service integrated with or in communication with the intelligent digital personal assistant 112 or application 104. According to an aspect, the NL processor 208, illustrative of a software module, system, or device operative to receive an explicit request from a user, such as an explicit request to capture information or an explicit request to retrieve captured information, and to process, understand, and extract information from the request for providing a response. As should be appreciated, the NL processor 208 includes functionality for understanding human speech as it is spoken.

Figure 3:
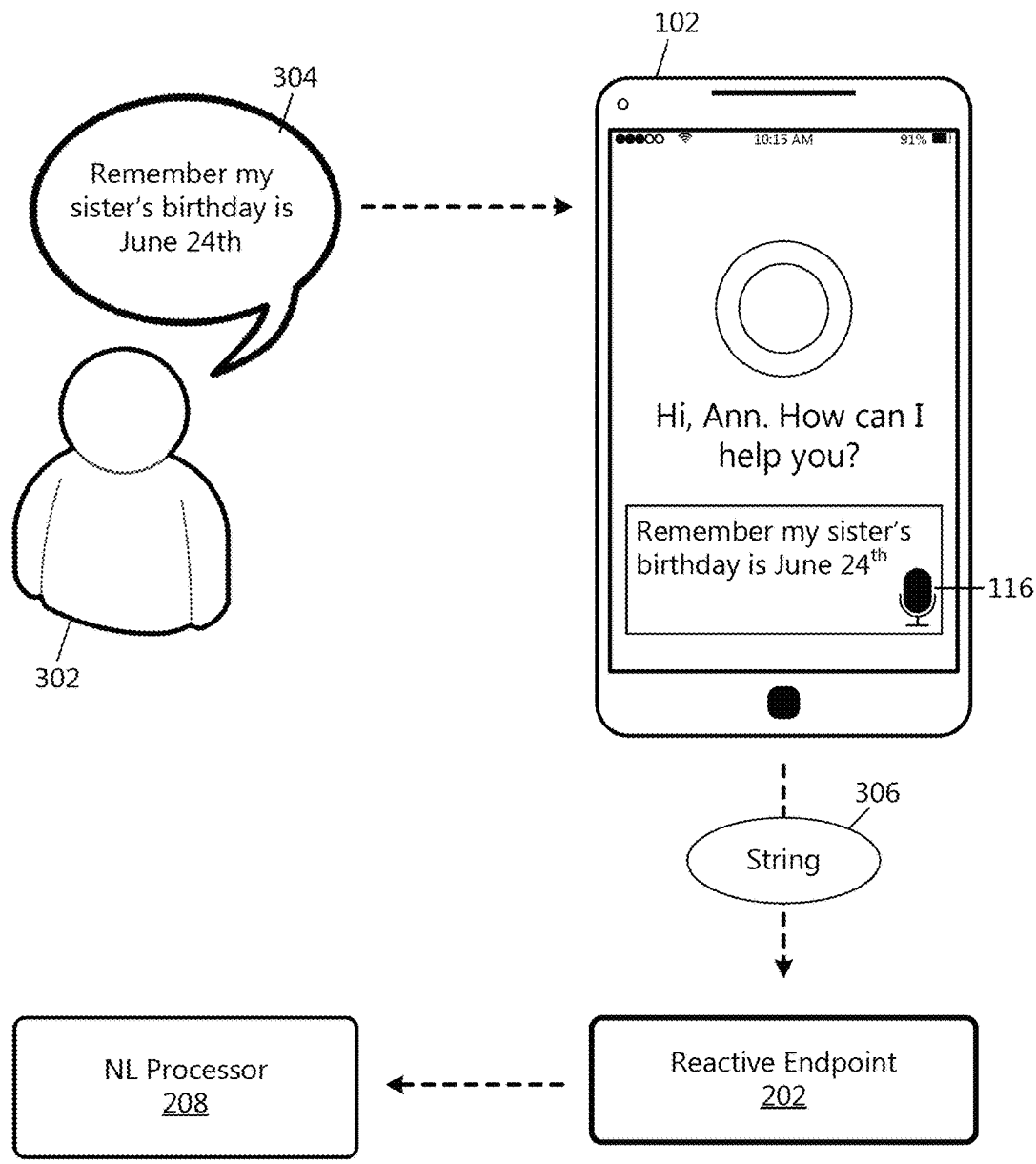
FIG. 3 is an illustration of an example explicit request to capture information.

An example illustrated in FIG. 3 shows a user 302 providing a request 304, such as a spoken command, via a natural input UI 116 employed by an intelligent digital personal assistant 112 executing on a computing device 102. In the illustrated example, the user 302 speaks a command (i.e., request 304) instructing the intelligent digital personal assistant 112 to "remember my sister's birthday is June 24$^{th}$" Accordingly, the intelligent digital personal assistant 112 generates a text string 306 of the user's request 304, and sends the text string 306 to the reactive endpoint 202 for transmission to the NL processor 208.

With reference again to FIG. 2, according to an aspect, the NL processor 208 includes a get/set classifier 210 and an entity/intent extractor 212. The get/set classifier 210 is operative to determine whether the user's request 304 is a get request or a set request. For example, if the user 302 explicitly requests for the intelligent digital personal assistant 112 to capture information, the request is classified as a set request. As another example, if the user 302 explicitly requests for the intelligent digital personal assistant 112 to retrieve information (which may be a request to perform a function related to captured information), the request is classified as a get request.

The entity/intent extractor 212 is operative to process the received string 306, and convert the data to a set (key, value) pair set, where the key refers to a specific feature corresponding to a topic of the request 304, and the value represents specific descriptive information for that feature. For example, in the example illustrated in FIG. 3, the entity/intent extractor 212 is operative to extract "sister's birthday" as the key and "June 24$^{th}$" as the value.

Referring still to FIG. 2, the ICSR system 106 further includes a capture and response service 214 including a reactive module 216 and a proactive module 220. According to an aspect, the reactive module 216 includes a data type identifier 218 and a data handler 219. The data type identifier 218 is operative to determine where to store the explicitly captured information. In one example, the data type identifier 218 makes a determination as to whether the request 304 includes high business impact (HBI) information, such as authentication/authorization credentials (i.e., usernames and passwords, private cryptography keys, PIN's, and hardware or software tokens), highly sensitive personally identifiable information (PII) including government provided credentials (i.e. passport, social security, or driver's license numbers), financial data such as credit card information, credit reports, or personal income statements, medical information such as records and biometric identifiers, etc. When HBI information is identified, the data type identifier 218 classifies the key-value pair as HBI information, and makes a determination to store the key-value pair in an HBI store 235 index 240, for example, which may employ more stringent permissions and authorizations for accessing HBI-classified information. When HBI information is not identified, the data type identifier 218 is operative to make a determination to store the key-value pair in a personal data store 236 index 240.

According to an aspect, the data handler 219 is operative to perform an index query on the determined data store index 240, and determine whether the key or key-value pair already exists. When a determination is made that the key or key-value pair already exists, the data handler 219 is operative to overwrite the stored data. When a determination is made that neither the key nor key-value pair have been previously stored, the data handler 219 is operative to store the key-value pair in the determined data store 235, 236. According to one example, the above-described processing steps performed by the various components of the ICSR system 106 are performed at query time, for example, when the user 302 makes an explicit request 304 to capture information. The dotted lines illustrated in FIG. 2 help to illustrate the query-time, non-query time processing components, and the data stores.

According to an aspect, non-query time processing components of the ICSR system 106 are employed to provide semantic understanding to the captured information. One non-query time processing component of the ICSR system 106 includes a data mining platform 226, illustrative of a data storage/query system where massive amounts of data (e.g., ranging from clickstreams and telemetry to documents, multimedia and tabular data) are analyzed to retrieve valuable information. In one example, the data mining platform 226 is operative to access the HBI data store 235 index 240 and the personal data store 236 index 240, and execute a data enrichment service 228 for understanding entities, entity types, and relationships between entities of captured information.

According to an aspect, the data enrichment service 228 comprises an entity, actions, and measures (EAM) identifier 232, illustrative of a software module, system, or device operative to identify an entity, the entity's properties, and the entity's relationships and events with other entities. In one example, the EAM identifier 232 analyzes captured information, and determines whether the captured information can be classified as a capture with a predefined schema. For example, captured information relating to a birthday may be recognized as a birthday capture, wherein the predefined schema includes a person object and a date object, which the EAM identifier 232 extracts. Continuing with the example from above where the user 302 explicitly requests to capture information relating to the user's sister's birthday, the EAM identifier 232 is operative to analyze stored captures, and identify the entity and the entity's properties. For example, the EAM identifier 232 is operative to identify that "sister's birthday" relates to the user's sister, who, for example, is named Bella, and that "June 24$^{th}$" is a date object.

Further, the EAM identifier 232 is operative to identify the entity's relationships and events with other entities and relevant actions associated with the entity, entity-type, or with other associated entities. For example, based on other stored data, which may include previously explicitly or implicitly captured data, the EAM identifier 232 may determine that Bella is a teenager, and has an affinity for painting and yoga, and enjoys music by a music group called Prana. Accordingly, the EAM identifier 232 is operative to create objects representative of each entity, for example:

entity=Prana;

entity type=music group;

relevant actions=purchase tickets, stream audio and/or video, download audio and/or video, purchase merchandise, get related music, . . . .

According to an aspect, the data enrichment service 228 further comprises a task priority generator 234, illustrative of a software module, system, or device operative to prioritize actions or tasks based on a determined importance to the user 302. For example, for the task priority generator 234 is operative to prioritize identified relevant actions (i.e., tasks) associated with an entity based on collected data, such as the user's usage or reaction to previously suggested tasks, search logs (e.g., what users searched for, what they clicked on), browser logs (e.g., what sites users visit, the browsing order), advertising logs (e.g., what ads users click on, what was shown). The collected data may be associated with the particular user 302, or may be associated with collective users.

Figure 4:
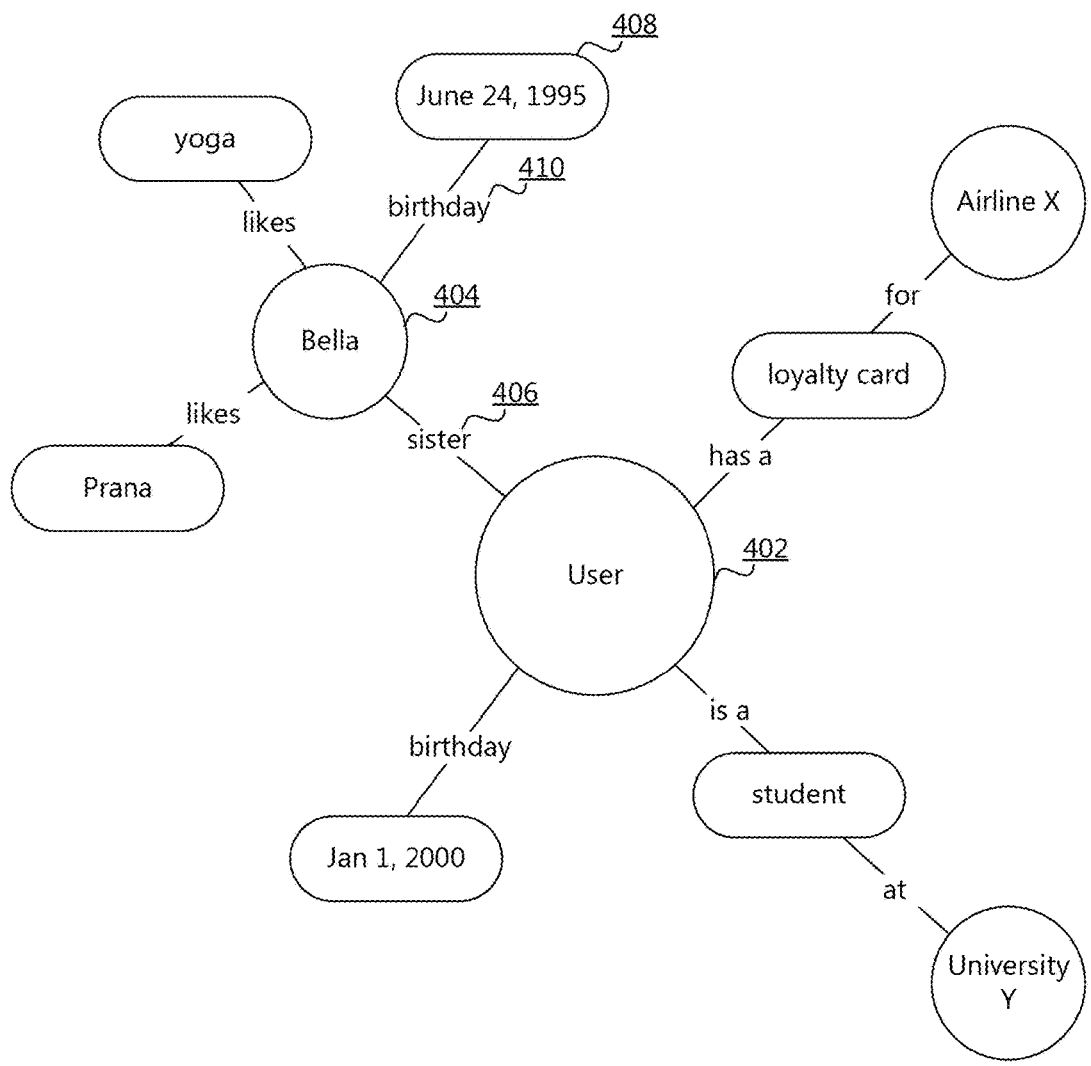
FIG. 4 is an illustration of a portion of an example graph representing a structured schematic of entities and their properties and how they relate to the user.

According to an aspect, the data enrichment service 228 is further operative to pass the identified entities, properties, and prioritized tasks to an inference generator 246. The inference generator 246 is illustrative of a software module, system, or device operative to index and represent the identified entities, properties, and relationships between the entities in a knowledge graph 238, and to identify additional relationships between objects in the graph. For example, the inference generator 246 is operative to represent entities and properties as nodes, and attributes and relationships between entities as edges, thus providing a structured schematic of entities and their properties and how they relate to the user 302. A portion of an example knowledge graph 238 for the user 302 is illustrated in FIG. 4. For example, a first node 402 represents the user 302, and is connected to a next node 404 representative of Bella by an edge 406 representing a sister relationship. Further, the node 404 representing Bella is connected to another node 408 representative of a date, Jun. 24, 1995, by an edge 410 representing a birthday relationship.

With reference again to FIG. 2, the inference generator 246 is further operative to store the semantically-enriched data represented in the graph 238 and index 240 in the personal data store 236 or the HBI data store 235, enabling queries to be made to obtain information on the entities contained therein. In one example, the user 302 is enabled to explicitly request information, wherein a query is made on the index 240 for the explicitly-requested information. In another example, information may be proactively provided to the user 302, for example, based on context, wherein an automated query is made on the index 240 for context-specific information. Explicit and proactive information retrieval will be described in further detail below.

According to an aspect, the data enrichment service 228 further comprises a candidate capture generator 230, illustrative of a software module, system, or device operative to mine through stored data, and determine whether there are potential candidate information items for capturing and storing for the user 302. For example, the data mining platform 226 may have access to one or more data stores, such as online data store 242. In one example, the online data store 242 is a cloud-based repository including the user's documents, photos, music, email attachments, contacts, etc. The candidate capture generator 230 is operative to mine through the user's data, and analyze the data for determining whether an information item is information to implicitly capture and store for the user. In one example, the candidate capture generator 230 analyzes the data to determine whether an information item matches a predefined schema, wherein the predefined schema defines semantics of a particular capture type. According to an aspect, analysis includes analyzing optical character recognition (OCR) data, global positioning satellite (GPS) data, or other metadata associated with the stored data.

In one example, the user may have a photo capture of a loyalty card stored in the online data store 242. By using recognition technologies, such as OCR, semantics of the loyalty card can be extracted and structured. The candidate capture generator 230 may comprise a predefined schema for a loyalty card defining various semantics to extract. Accordingly, when an information item with a predefined schema is discovered in the online data store 242, such as an image of a loyalty card, the candidate capture generator 230 implicitly captures the information item and passes it to the EAM identifier 232. For example, for a loyalty card, the EAM identifier 232 may identify and extract a business entity, a number, a barcode, etc. Other non-limiting examples of information items that may have a predefined schema defining extractable semantics include a policy document, a passport, a birth certificate, a credit card, medication, etc. For example, for a policy document, the EAM identifier 232 may identify and extract a business entity, a policy number, a policy expiration date, etc. According to an aspect, as with explicit captures, predefined semantics of implicit captures can be identified and extracted, and then passed to the inference generator 246, where the extracted information can be indexed, graphed, and where new relationships can be discovered and generated. For example, using a knowledge graph, additional metadata related to the entity associated with a capture can be identified and stored in the graph 238 as nodes connected to the captured entity, thus providing enriched data. Additionally, the stored enriched data is indexed.

According to an aspect, the ICSR system 106 further includes a proactive module 220 comprising a capture confirmer 222. The capture confirmer 222 is illustrative of a software module, system, or device operative to identify captures that have not been confirmed, such as implicitly captured information, for presentation to the user 302. For example, when the intelligent digital personal assistant 112 is opened, a call is made to the capture confirmer 222 via a proactive endpoint 204 to query the index 240 for new data identified about the user 302, for example, information items discovered by the candidate capture generator 230. In one example, the proactive endpoint 204 is manifested on the user's computing device 102. In another example, the proactive endpoint 204 is manifested in a service connected to the user (e.g., an application service, a service with which the user has an account).

When new data that has not been confirmed is discovered, the capture is presented to the user 302 for confirmation. For example, if a loyalty card for a particular airline is implicitly captured (e.g., including additional metadata), the intelligent digital personal assistant 112 indicates to the user 302 that the loyalty card was captured, and asks the user whether the user would like for the system to remember the loyalty card. When the user indicates that he/she would not like for the system to remember a capture, the capture confirmer 222 is operative to remove the capture from the index 240. Else, when the user indicates that he/she would like for the system to remember a capture, the capture confirmer 222 is operative to mark the capture as a confirmed capture in the index 240, and the schematized capture, including additional metadata, is ready to be used for task completion.

In some examples, captured information can be proactively surfaced to the user via the proactive endpoint 204. According to an aspect, contextual data (e.g., time/date, the user's location, language, schedule, applications installed on the device, the user's preferences, the user's behaviors (in which such behaviors are monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., their schedules, preferences, etc.)), is communicated to the ICSR system 106 via the proactive endpoint 204.

As illustrated in FIG. 2, the proactive module 220 further includes a contextual trigger 224, illustrative of a software module, system, or device operative to receive contextual data, query the index 240 for confirmed captured information that is responsive to the contextual data. Consider, for example, that the user 302 is utilizing a browser application 104 to navigate to a website associated with Airline X for booking an airline ticket. From the system's semantic understanding, the ICSR system 106 is aware that there is captured information relating to Airline X, for example, a captured loyalty card for Airline X, wherein semantic understanding enables the system to know that the loyalty card helps the user to save money and provides benefits to the user 302. Accordingly, the contextual trigger 224 queries the index 240 for information to proactively surface to the user. For example, when relevant information to proactively surface to the user is identified by the contextual trigger 224, the identified information is retrieved and provided to the user via the proactive endpoint 204. As an example, the user's Airline X loyalty card number can be automatically input into an appropriate field in the website. According to other examples, proactively retrieved captured information relevant to the user based on context can be provided to the user in other ways, such as by automatically performing a function related to the proactively retrieved captured information, operating the computing device 102, or by performing various other functions.

According to an example, when the user 302 explicitly requests to perform a function related to retrieving explicitly or implicitly captured information, the reactive endpoint 202 is operative to pass the request to the NL processor 208. The user 302 may make a request for captured information, make a request to perform a task or to provide a service related to captured information, etc., via an interaction with the intelligent digital personal assistant 112 (through the natural language UI or GUI). As an example, the user 302 may speak or type a request such as, "when is Bella's birthday," or "what is my Airline X loyalty number?" Accordingly, the request is received by the reactive endpoint 202, and sent the request to the NL processor 208, operative to identify that the user is requesting information and the information the user is requesting for querying the index 240.

As described above, the NL processor 208 includes a get/set classifier 210 operative to determine whether the user's request 304 is a get request or a set request. In a scenario where the user 302 explicitly requests to retrieve captured information or explicitly request to perform a function related to captured information, the get/set classifier 210 classifies the request as a get request. Further, the entity/intent extractor 212 processes the received string 306, and converts the data to a set (key, value) pair set, where the key refers to a specific feature corresponding to a topic of the request 304, and the value represents specific descriptive information for that feature for querying the index 240.

The reactive endpoint 202 is further operative to receive a response from the ICSR system 106 for presentation to the user's computing device 102. For example, when a query to the index 240 is made, and the requested information is found, a response is generated and provided to the user 302, for example, through the natural language UI, GUI, or by performing a task, providing a service, gathering information, operating the computing device 102, or by performing various other functions. The list of functions is not intended to be exhaustive, and other functions may be provided by the intelligent digital personal assistant 112 for task completion. In some examples, a capture service 206 is utilized, wherein ICSR system functionalities are exposed as a service to other experiences. Further, in some examples, the ICSR system 106 includes a metrics generator 244, illustrative of a software module, system, or device operative to measure whether captured information is being utilized by the user 302, for example, for providing feedback for machine learning.

Figure 5:
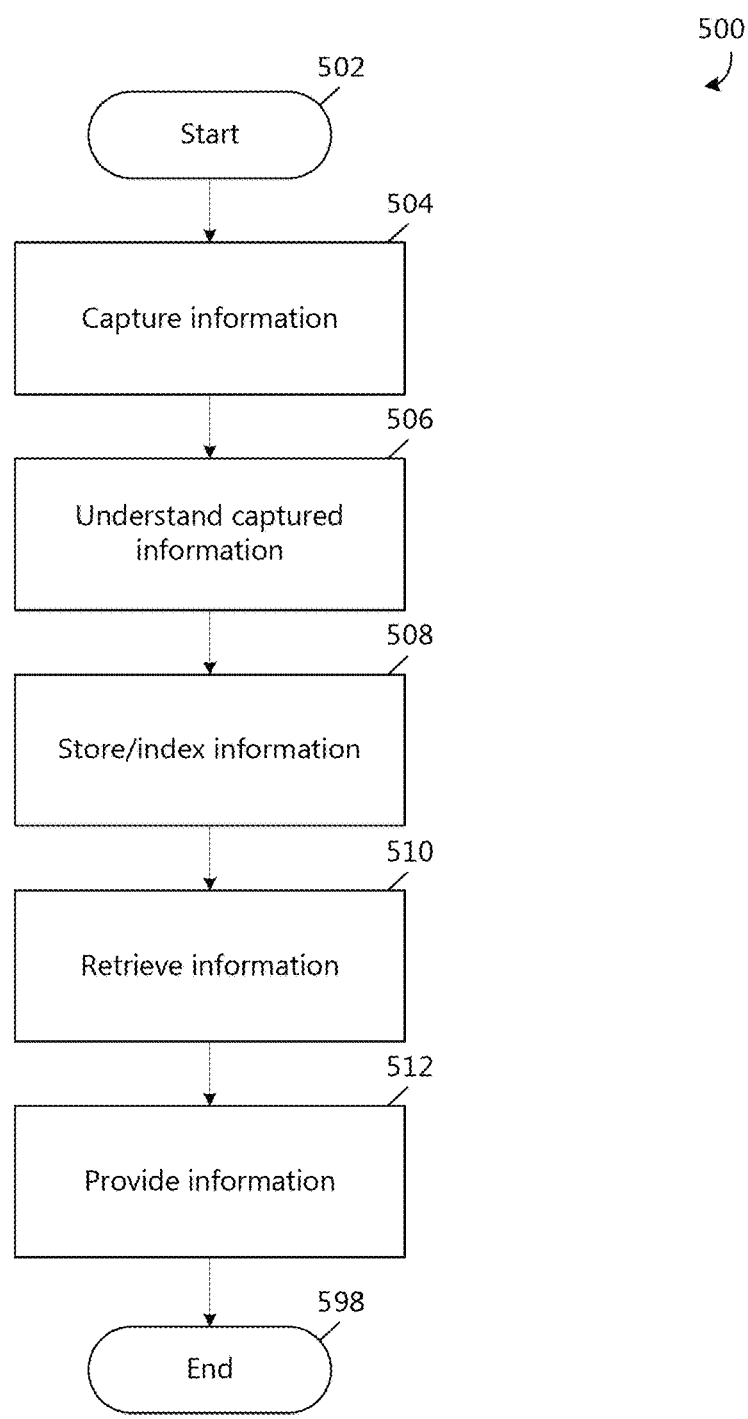
FIG. 5 is a flowchart showing general stages involved in an example method for providing intelligent capture, storage, and retrieval of information for task completion.

Having described an example operating environment and various examples, FIG. 5 is a flowchart showing general stages involved in an example method 500 for providing intelligent capture, storage, and retrieval of information for task completion. Method 500 begins at OPERATION 502, and proceeds to OPERATION 504, where information is captured. In one example, a user 302 makes an explicit request to capture information, wherein the reactive endpoint 202 passes the request to the ICSR system 106. In another example, data stored in an online data store 242 is analyzed, and an information item is identified as a candidate to implicitly capture, for example, the information item is identified as an item comprising predefined schema.

The method 500 proceeds to OPERATION 504, where the captured information is understood. For explicitly captured information, the NL processor 208 is enabled to extract a key and value from the captured information, and determine where to store the extracted dataset. Explicitly and implicitly captured information is processed by the data enrichment service 228, where the information is analyzed for identifying entities, properties, and actions, and is passed to the inference generator 246 for discovering metadata and generating new relationships to further enrich the data and to provide a schematized structure to the data. For example, the captured information is represented in a knowledge graph 238 as a network of nodes and edges connected to the user.

The method 500 continues to OPERATION 506, where the enriched data is stored and indexed. At OPERATION 508, the captured information is retrieved. In one example, the user 302 makes an explicit request to retrieve captured information, such as via an interaction with the intelligent digital personal assistant 112 or application 104 through the natural language UI or GUI. In another example, via the proactive endpoint 204, a call is made to the contextual trigger 224 to look at confirmed captured information and to determine whether there is any information to proactively surface to the user based on context data provided by the proactive endpoint.

At OPERATION 510, in response to an explicit request or in response to discovering information to proactively surface to the user, captured information is provided to the user via the reactive endpoint 202 or the proactive endpoint 204. For example, captured information may be made visible to the user in the form of text, images, or other visual content shown on a display within a GUI of the intelligent digital personal assistant 112 or application 104, may be made audible to the user in for form of computer-generated speech or other audio content that is played back via speaker(s) of the computing device 102 or connected to the computing device, or may be provided to the user by performing a task or providing a service (OPERATION 512). The method 500 ends at OPERATION 598.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
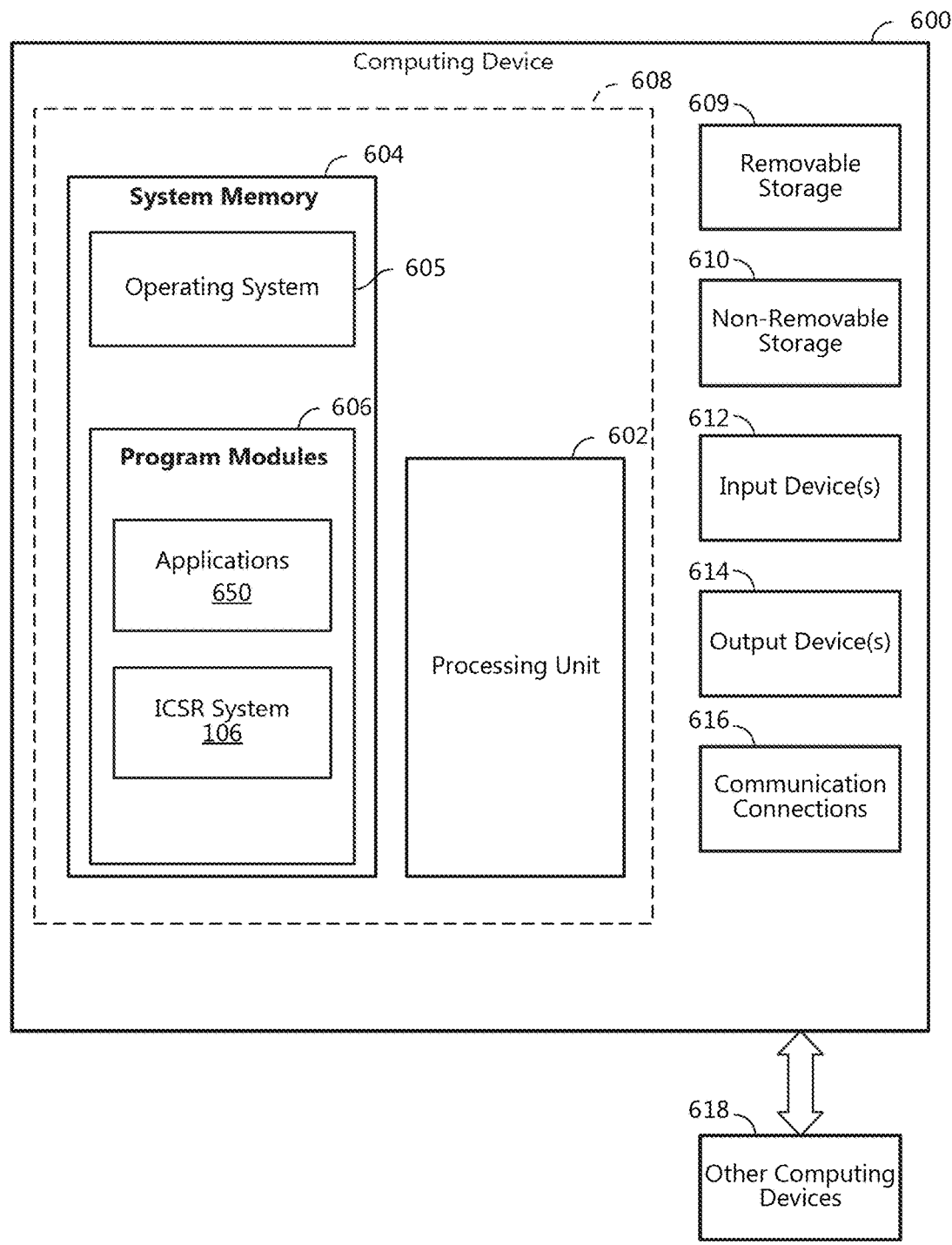
FIG. 6 is a block diagram illustrating physical components of a computing device with which examples may be practiced.
Figure 7A:
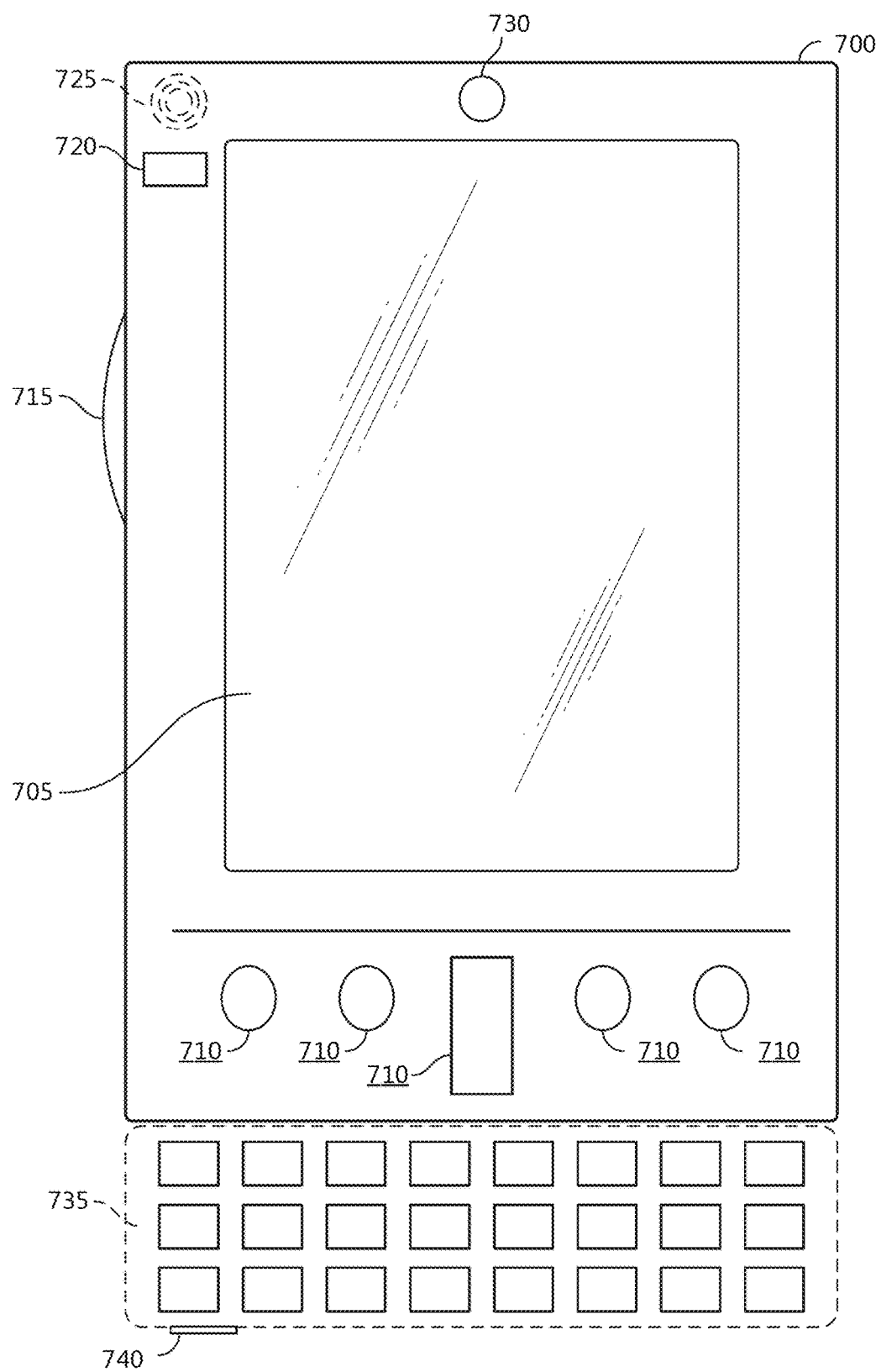
FIGS. 7A and 7B are block diagrams of a mobile computing device with which aspects may be practiced.
Figure 7B:
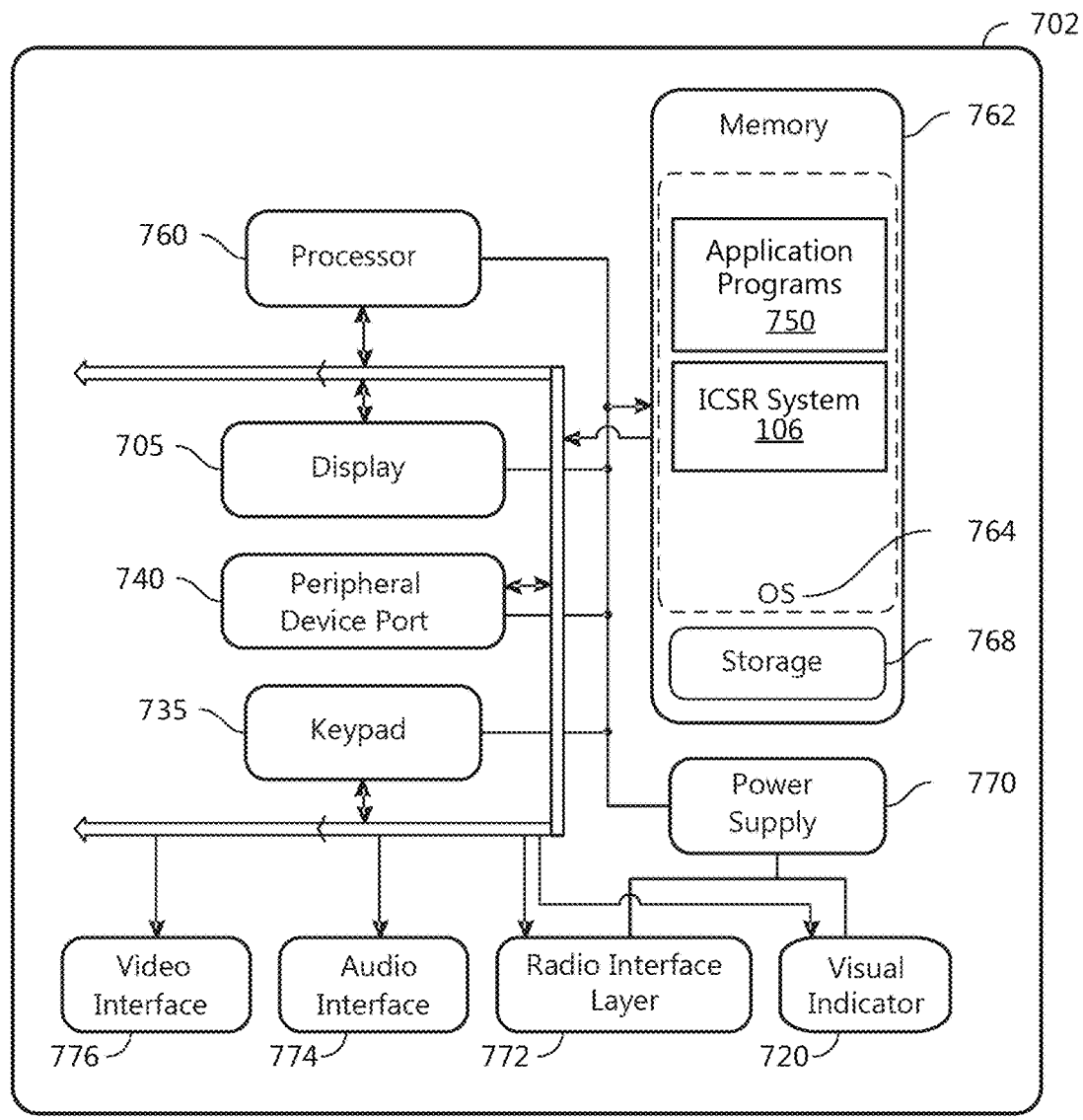
Figure 8:
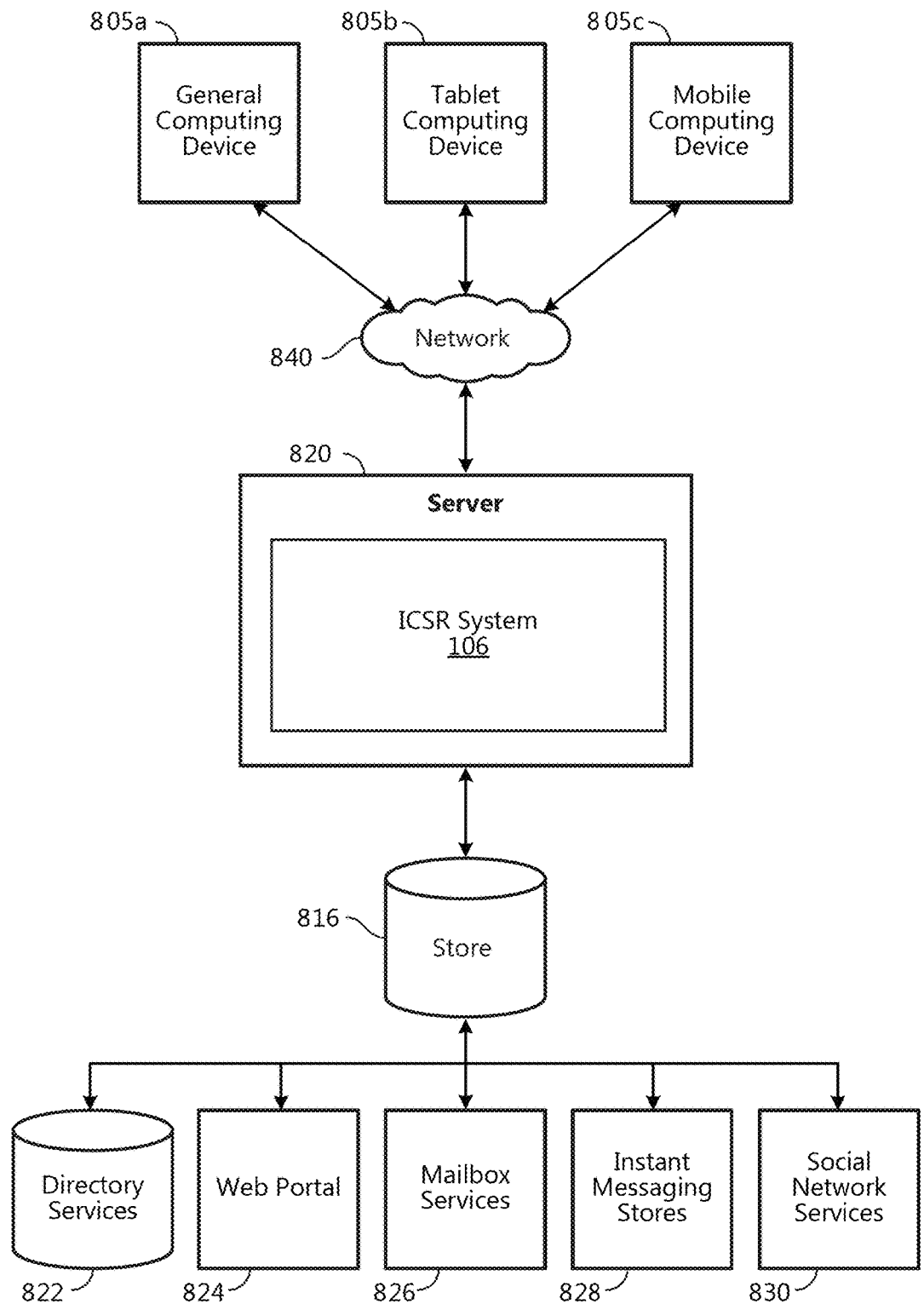
FIG. 8 is a block diagram of a distributed computing system in which aspects may be practiced.

FIGS. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes an ICSR system 106, operative to enable a software application 650 to employ the teachings of the present disclosure via stored instructions. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., ICSR system 106) perform processes including, but not limited to, one or more of the stages of the method 500 illustrated in FIG. 5. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or fewer input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates a peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the ICSR system 106 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 are stored locally on the mobile computing device 700, as described above. According to another aspect, the data are stored on any number of storage media that are accessible by the device via the radio 772 or via a wired connection between the mobile computing device 700 and a separate computing device associated with the mobile computing device 700, for example, a server computer in a distributed computing network, such as the Internet. As should be appreciated, such data/information are accessible via the mobile computing device 700 via the radio 772 or via a distributed computing network. Similarly, according to an aspect, such data/information are readily transferred between computing devices for storage and use according to well-known data/information transfer and storage means, including electronic mail and collaborative data/information sharing systems.

FIG. 8 illustrates one example of the architecture of a system for automatic presentation of blocks of repeated content as described above. Content developed, interacted with, or edited in association with the ICSR system 106 is enabled to be stored in different communication channels or other storage types. For example, various documents may be stored using a directory service 822, a web portal 824, a mailbox service 826, an instant messaging store 828, or a social networking site 830. The ICSR system 106 is operative to use any of these types of systems or the like for providing intelligent capture, storage and retrieval of information for task completion, as described herein. According to an aspect, a server 820 provides the ICSR system 106 to clients 805*a-c* (generally clients 805). As one example, the server 820 is a web server providing the ICSR system 106 over the web. The server 820 provides the ICSR system 106 over the web to clients 805 through a network 840. By way of example, the client computing device is implemented and embodied in a personal computer 805*a*, a tablet computing device 805*b* or a mobile computing device 805*c* (e.g., a smart phone), or other computing device. Any of these examples of the client computing device are operable to obtain content from the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:
1. A method for analyzing captured information for task completion, the method comprising:
analyzing a captured information item associated with a user to identify an entity and properties associated with the captured information item;
storing the entity and the properties associated with the captured information item in a knowledge graph;
enriching the knowledge graph, wherein enriching the knowledge graph comprises:
identifying relationships between the entity and the properties,
identifying other entities associated with the entity, and
representing the identified relationships and the identified other entities in the knowledge graph;
based on the identified relationships and the identified other entities of the enriched knowledge graph, identifying a plurality of actions, each action associated with one or more of the entity, a type of the entity, one or more of the identified other entities, and a type of one or more of the identified other entities;
prioritizing the identified actions based on an importance of each action to the user, the importance determined based on the user's previous usage of and reactions to the respective action;
indexing the entity, the properties, and the prioritized actions in an index;
receiving an indication to query the index for the captured information item;
querying the index for the captured information item;
retrieving the captured information item including the entity, the properties, and the prioritized actions from the index; and
providing the captured information item for presentation to the user, wherein one or more of the identified actions are presented based on a respective priority.
2. The method of claim 1, wherein:
analyzing the captured information item comprises analyzing an implicitly captured information item; and
prior to analyzing the captured information item, mining through stored data for identifying an information item to capture and store for the user.
3. The method of claim 2, wherein mining through the stored data comprises mining through a cloud-based repository for the user including the user's documents, photos, and email attachments.
4. The method of claim 3, wherein mining through the stored data for identifying the information item to capture and store for the user comprises analyzing optical character recognition metadata associated with the stored data.
5. The method of claim 2, wherein identifying the information item to capture and store for the user comprises determining whether the information item matches a predefined schema, wherein the predefined schema defines semantics of a particular capture type.
6. The method of claim 1, wherein:
analyzing the captured information item comprises analyzing an explicitly captured information item; and
prior to analyzing the captured information item:
receiving an indication of a request from the user to capture the information item;

performing natural language processing on the request to extract a key and value dataset; and indexing the key and the value dataset in the index.

7. The method of claim 1, wherein prioritizing the identified actions based on the importance of each action to the user further comprises determining the importance based on collected data associated with the user or associated with collective users, the collected data selected from the group consisting of:

search logs;
browser logs; and
advertising logs.

8. The method of claim 1, wherein receiving the indication to query the index for the captured information item comprises receiving an explicit request for the captured information item via an interaction with an intelligent personal digital assistant through a natural language user interface or a graphical user interface.

9. The method of claim 1, wherein receiving the indication to query the index for the captured information item comprises receiving contextual data associated with the user for determining whether the index includes one or more captured information items that can be proactively surfaced to the user based on the contextual data.

10. The method of claim 9, wherein querying the index for the captured information item comprises querying the index for captured information items that can be proactively surfaced to the user based on the contextual data.

11. The method of claim 1, wherein providing the captured information item for presentation to the user on an endpoint computing device for task completion comprises at least one of the following:

providing a response via a natural language user interface;
performing a task;
providing a service;
gathering information; and
operating the endpoint computing device.

12. A system for analyzing captured information for task completion, the system comprising:

a processing unit; and
a memory, including computer readable instructions, which when executed by the processing unit is operable to:
  analyze a captured information item associated with a user to identify an entity and properties associated with the captured information;
  store the entity and the properties in a knowledge graph;
  enrich the knowledge graph, wherein the processing unit being operable to enrich the knowledge graph comprises the processing unit being operable to:
    identify relationships between the entity and the properties,
    identify other entities associated with the entity, and
    represent the identified relationships and the identified other entities in the knowledge graph;
  based on the identified relationships and the identified other entities of the enriched knowledge graph, identify a plurality of actions, each action associated with one or more of the entity, a type of the entity, one or more of the identified other entities, and a type of the identified other entities;
  prioritize the identified actions based on an importance of each action to the user, the importance determined based on the user's previous usage of and reactions to the respective action;
  index the entity, the properties, and the prioritized actions in an index;
  receive an indication to query the index for the captured information item;
  query the index for the captured information item;
  retrieve the captured information item including the entity, the properties, and the prioritized actions from the index; and
  provide the captured information item for presentation to the user, wherein one or more of the identified actions are presented based on a respective priority.

13. The system of claim 12, wherein:

the captured information is an implicitly captured information item; and
prior to analyzing the captured information item, the processing unit is operative to mine through stored data for identifying the information item to capture and store for the user, the stored data including data stored in a cloud-based repository, the repository including the user's documents, photos, and email attachments.

14. The system of claim 13, wherein in mining through the stored data for identifying the information item to capture and store for the user, the processing unit is operative to analyze optical character recognition metadata associated with the stored data.

15. The system of claim 12, wherein:

the captured information item is an explicitly captured information item; and
prior to analyzing the captured information item, the processing unit is further operative to:
  receive an indication of a request from the user to capture the information item;
  perform natural language processing on the request to extract a key and value dataset; and
  index the key and the value dataset in the index.

16. The system of claim 12, wherein the processing unit is further operative to prioritize the identified actions based on the importance of each action to the user by determining the importance based on collected data associated with the user or associated with collective users, the collected data selected from the group consisting of:

search logs;
browser logs; and
advertising logs.

17. The system of claim 12, wherein in receiving the indication to query the index for the captured information item, the processing unit is further operative to receive contextual data associated with the user for determining whether the index includes one or more captured information items that can be proactively surfaced to the user based on the contextual data.

18. A computer readable storage device including computer readable instructions, which when executed by a processing unit is operable to:

analyze a captured information item associated with a user to identify an entity and properties associated with the captured information item;
store the entity and the properties in a knowledge graph;
enrich the knowledge graph, wherein the processing unit being operable to enrich the knowledge graph comprises the processing unit being operable to:
  identify relationships between the entity and the properties,
  identify other entities associated with the entity, and
  represent the identified relationships and the identified other entities in the knowledge graph;

based on the identified relationships and the identified other entities of the enriched knowledge graph, identify a plurality of actions, each action associated with one or more of the entity, a type of the entity, one or more of the identified other entities, and a type of the identified other entities;

prioritize the identified actions based on an importance of each action to the user, the importance determined based on the user's previous usage of and reactions to the respective action;

index the entity, the properties, and the prioritized actions in an index;

receive an indication to query the index for the captured information item;

query the index for the captured information item;

retrieve the captured information item including the entity, the properties, and the prioritized actions from the index; and provide the captured information item for presentation to the user, wherein one or more of the identified actions are presented based on a respective priority.

19. The computer readable storage device of claim 18, wherein:

when the captured information item is an implicitly captured information item, prior to analyzing the captured information item, the processing unit is operable to mine through stored data for identifying the information item to capture and store for the user, the stored data including data stored in a cloud-based repository, the repository including the user's documents, photos, and email attachments; and when the captured information item is an explicitly captured information item, prior to analyzing the captured information item, the processing unit is operable to:
  receive an indication of a request from the user to capture the information item;
  perform natural language processing on the request to extract a key and value dataset; and
  index the key and the value dataset in the index.

20. The computer readable storage device of claim 18, wherein in receiving the indication to query the index for the captured information item, the processing unit is further operative to receive contextual data associated with the user for determining whether the index includes one or more captured information items that can be proactively surfaced to the user based on the contextual data.

* * * * *